Reissued Nov. 7, 1933

Re. 18,988

UNITED STATES PATENT OFFICE 18,988

METHOD OF TREATING LUBRICANTS

William Orton Stevens, Princeton, Ill., assignor to Anti Hot Box Company, Incorporated, Princeton, Ill., a corporation of Illinois No Drawing. Original No. 1,796,310, dated March 17, 1931, Serial No. 371,306, June 15, 1929. Application for reissue August 20, 1931. Serial No. 558,425

4 Claims. (Cl. 87—9)

This invention relates to improvements in lubricant and method of treating the same.

An object of the invention is to provide an improved simple and inexpensive method for largely increasing the friction-reducing properties of lubricating oils.

In practicing this invention, wood ashes, and preferably those of hard wood, are heated to a high temperature, preferably together with a small proportion of ground animal bone until practically all moisture is driven off and any charcoal or combustible matter remaining in said ashes is fully consumed. The proportion of animal bone mixed with the wood ashes is susceptible of considerable variation without materially changing the final result, but the preferred proportions are ninety-eight per cent of ashes to two per cent of bone. This heating operation may be accomplished in any desired manner, it being preferred, however, in practicing the invention on a large scale to continuously pass the ashes through a rotary kiln.

Treatment of the oil by the ashes or mixture of ashes and ground bone may be variously accomplished, the primary essential being to thoroughly saturate with the oil a quantity of the ashes or mixture properly proportioned to the body of oil to be treated and the immersion (preferably complete) of the active solid in said body of oil for an adequate time to permit the solid to act on the entire body of oil. One method of applying the treatment is as follows.

A body of oil to be treated is placed in a suitable tank or other container and a proportionate quantity of the ashes or mixture is put into a receiver having a perforated bottom or wall with its perforations covered by suitable filtering material, as for example, cotton or felt sheeting. A sufficient thickness of such material should be used to quite positively avoid any escape of solid particles from the receiver into the surrounding oil body. After its contents have been thoroughly saturated with the oil, the receiver is immersed (preferably completely) in the oil to be treated. The preliminary saturation of the ashes permits the receiver to be of an open-topped type without any upward floating of the ashes into the oil. The described immersion is continued for a suitable period of time, preferably for about forty-eight hours, the receiver then being removed or the oil drawn off. It has been found that the satisfactory treatment of five gallons of lubricating oil may be effected by the treatment of such oil, as described, by approximately one pound of the active solid.

While the precise manner in which oil responds to the presence of the ashes or mixture is not fully understood, it has been thoroughly established by innumerable tests that the described treatment of oil accomplishes a very perceptible increase in its lubricating value. Tests have shown that the treated oil is from ten to forty per cent more effective in reducing friction than untreated oil. In employing the treated oil for lubricating internal combustion engines, it has been found that the time requisite for breaking in such engines is only one fifth as great where the treated oil is used as is required under use of the untreated oil. In other tests cylinders of motor vehicle engines lubricated by the treated oil have shown no appreciable wear after forty thousand (40,000) miles of travel. A peculiar and desirable characteristic of the lubricating oil treated in accordance with this invention is the fact that its use appreciably reduces the friction coefficients of engaging surfaces lubricated by such oil. Thus such oil finds a large field of use in lubricating engines or other machinery during the "running in" period, tending to reduce the requisite length of that period, even although an ordinary or untreated lubricant be substituted when the bearings, journals or other parts are reduced to proper running condition. The effect thus poduced by the treated oil upon engaging lubricated surfaces is their reduction to a smooth, glassy, and highly impervious condition. Because of its ability to produce this effect, the treated oil may also be applied beneficially to a metallic surface during the burnishing and polishing thereof.

It is further to be noted that the described treatment effects a marked increase in the penetrating capacity of lubricating oils, adapting them to enter restricted spaces far more readily than before.

A highly desirable feature of the described treatment is the fact that the active solid (namely, wood ashes) forming the main essential to the treatment is practically a waste product, rendering the cost of the treatment very slight.

While it appears from such tests and experiments as have been performed at this time that hardwood ashes together with a small percentage of finely divided animal bone may be employed to best advantage as the active agent, it is to be noted that desirable results have been obtained by hardwood ashes alone.

What I claim is:

1. A method of treating lubricating oil, consisting in first drying wood ashes, then so immersing the dried ashes in the oil to be treated as to insure a saturation of the ashes by the oil, and finally removing the ashes from the oil.

2. A method of treating lubricating oil, consisting in drying wood ashes and animal bone and mixing a relatively small quantity of the bone, in a finely divided state, with the ashes, then immersing the mixture in the oil to be treated so as insure a complete saturation of the mixture by the oil, and finally removing the mixture from the oil.

3. A method of treating lubricating oil, consisting in drying wood ashes, placing said ashes in a container pervious to oil, immersing said container and its contents in the oil to be treated, for a period of time permitting thorough penetration of the ashes by the oil, and removing the container and its contents from the oil.

4. A method of treating lubricating oil consisting in drying wood ashes, immersing the dried ashes in the oil to be treated in substantially the ratio of one pound of the ashes to five gallons of the oil, and removing the ashes subsequent to their thorough penetration by the oil.

WILLIAM ORTON STEVENS.